United States Patent
Siwo

(10) Patent No.: US 11,061,396 B2
(45) Date of Patent: Jul. 13, 2021

(54) BEACON AND A METHOD FOR PROVIDING INSTRUCTIONS TO AN AUTONOMOUS AGENT

(71) Applicant: International Business Machines Corporation, Armonk, NY (US)

(72) Inventor: Geoffrey H Siwo, Sandton (SA)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 15/847,949

(22) Filed: Dec. 20, 2017

(65) Prior Publication Data
US 2019/0187694 A1    Jun. 20, 2019

(51) Int. Cl.
| G05D 1/00 | (2006.01) |
|---|---|
| G06K 19/06 | (2006.01) |
| G10L 25/90 | (2013.01) |
| G10L 25/51 | (2013.01) |
| G08G 1/00 | (2006.01) |

(52) U.S. Cl.
CPC .......... *G05D 1/0022* (2013.01); *G05D 1/0088* (2013.01); *G05D 1/0094* (2013.01); *G06K 19/06103* (2013.01); *G06K 19/06112* (2013.01); *G08G 1/00* (2013.01); *G10L 25/51* (2013.01); *G10L 25/90* (2013.01)

(58) Field of Classification Search
CPC ........... G05D 1/00; G10L 25/51; G10L 25/90; G06K 19/06
USPC .......................................................... 701/23
See application file for complete search history.

(56) References Cited

U.S. PATENT DOCUMENTS

| 8,676,427 B1* | 3/2014 | Ferguson | B60W 10/20 701/23 |
|---|---|---|---|
| 9,440,647 B1* | 9/2016 | Sucan | B60W 30/18154 |
| 9,672,732 B1* | 6/2017 | Aladas | G08C 17/02 |
| 9,784,835 B1* | 10/2017 | Droz | G08G 1/166 |
| 10,380,886 B2* | 8/2019 | Ran | G08G 1/0133 |
| 2014/0320318 A1* | 10/2014 | Victor | G01C 21/3685 340/932.2 |
| 2016/0070264 A1* | 3/2016 | Hu | G08G 5/04 701/2 |
| 2017/0017237 A1* | 1/2017 | Tokuyama | G05D 1/0246 |
| 2017/0039857 A1* | 2/2017 | Kwan | G05D 1/0022 |
| 2017/0102699 A1 | 4/2017 | Anderson | |
| 2017/0123422 A1* | 5/2017 | Kentley | B60L 15/20 |
| 2017/0249839 A1* | 8/2017 | Becker | H04W 4/90 |

(Continued)

OTHER PUBLICATIONS

Fazal et al., "Design of Secured, High Speed Two Way RF Data Link for Airborne Vehicle Communication", IEEE MTT-S International Microwave and RF Conference, 2013.

*Primary Examiner* — Peter D Nolan
*Assistant Examiner* — Wae L Louie
(74) *Attorney, Agent, or Firm* — Scully, Scott, Murphy & Presser, P.C.; Shimon Benjamin

(57) ABSTRACT

An example embodiment of the invention provides a beacon for providing instructions to an autonomous agent. The beacon comprises an audio or visual output arrangement which is configured to output an audio or visual machine-readable signal. The machine-readable signal is configured to provide an instruction to the autonomous agent. The audio or visual output arrangement is configured to provide the output such that the machine-readable signal is, at least partially, inaudible, invisible, or incomprehensible to humans.

20 Claims, 6 Drawing Sheets

(56) References Cited

U.S. PATENT DOCUMENTS

| | | | |
|---|---|---|---|
| 2018/0233047 A1* | 8/2018 | Mandeville-Clarke | ..................... B60W 30/00 |
| 2018/0284772 A1* | 10/2018 | Ravichandran | ....... B60W 10/04 |
| 2018/0300567 A1* | 10/2018 | Qin | .................... G06K 9/00825 |
| 2018/0335781 A1* | 11/2018 | Chase | .............. G08G 1/096758 |
| 2018/0336780 A1* | 11/2018 | Ran | ...................... G08G 1/0129 |
| 2019/0138934 A1* | 5/2019 | Prakash | ............. G06K 9/00993 |
| 2019/0187694 A1* | 6/2019 | Siwo | ................. G05D 1/0022 |

\* cited by examiner

BEACON AND A METHOD FOR PROVIDING INSTRUCTIONS TO AN AUTONOMOUS AGENT

BACKGROUND

The present invention relates generally to autonomous agents (e.g., autonomous vehicles) and more specifically to a beacon and a method for providing instructions to an autonomous agent.

SUMMARY

An embodiment of the invention discloses a beacon for providing instructions to an autonomous agent. The beacon comprises an audio or visual output arrangement which is configured to output an audio or visual machine-readable signal, wherein the machine-readable signal is configured to provide an instruction to the autonomous agent, and wherein the audio or visual output arrangement is configured to provide the output such that the machine-readable signal is, at least partially, inaudible, invisible, incomprehensible to humans.

An embodiment of the invention also discloses an autonomous agent system including the beacon and an autonomous agent which includes a receiver which is receptive to the machine-readable signal, and a processor which is configured to execute the instruction of the machine-readable signal.

An embodiment of the invention also relates to a corresponding method of providing instructions to an autonomous agent.

DETAILED DESCRIPTION

Figure 1:
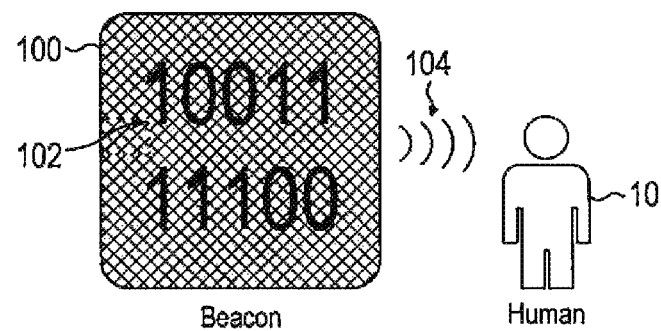
FIG. 1 illustrates a schematic view of a beacon for providing instructions to an autonomous agent, in accordance with an example embodiment of the invention, when viewed by a human.

Example embodiments of the present invention disclose a beacon and a method for providing instructions to an autonomous agent. Examples of autonomous agents include self-driving cars/vehicles and robots. These autonomous agents are increasingly fulfilling roles that have previously been fulfilled by humans. Many of these roles, such as driving, involve the provision of additional instructions from the surrounding environment, for example, road signs, that guide humans to perform the tasks in a defined manner at specific junctures of the tasks or environments.

Current autonomous systems such as self-driving cars are being trained to recognize these instructions (road signs). This may be less than ideal as the instructions were intended to be human-readable; the autonomous agents may not always be able to infer implied instructions.

This present disclosure endeavors to solve this problem using a beacon for generating a visual or audio output (e.g., images or sounds) which may have no meaning to humans and/or may be undetectable or incomprehensible to humans to execute a specific action, but which can be accurately detected and interpreted by the autonomous agent to execute desired instructions. Example applications include self-driving cars, robotics, and enhancing short-range communication between devices in the internet of things.

Accordingly, an example embodiment of the present invention discloses a beacon configured to provide instructions to an autonomous agent. The beacon may comprise an audio or visual output arrangement which is configured to output an audio or visual machine-readable signal, wherein the machine-readable signal is configured to provide an instruction to the autonomous agent, and wherein the audio or visual output arrangement is configured to provide the output such that the machine-readable signal is, at least partially, inaudible or invisible or incomprehensible to humans.

The term "beacon" may include a sign (whether non-electronic or electronic), an electronic transmitter, a tag or token, a display, a printed article, indicia provided on an article, a computer system with a visual or audio output arrangement, a dedicated electronic device with a visual or audio output arrangement, etc.

In other words, the beacon may provide a means for encoding and delivering instructions to an autonomous agent using visual and/or audio signals that activate desired software routines in the autonomous agent. Currently, autonomous agents may be able to receive instructions through hard-coded computer programs or a dedicated control signal from a control station. However, as autonomous agents increasingly operate in tasks where humans take instructions from the environment (e.g. driving requires humans to follow road signs), the agents need to be able to receive additional instructions from their environment. Computer vision techniques are primarily used to solve this problem by training autonomous agents to recognize the human-readable instructions. However, autonomous agents still perform poorly in interpreting these human-readable instructions since they are not optimized for computer vision.

FIG. 1 illustrates a schematic diagram of a beacon 100 in accordance with an example embodiment of the invention. It will be appreciated that it is difficult to illustrate visually that which is intended to be (at least partially) invisible. In this example, the beacon 100 is a visual beacon and thus comprises a visual output arrangement 102. The output arrangement 102 may be printed media/indicia, an electronic display, etc. The output display arrangement outputs a visual machine-readable signal 104.

In FIG. 1, the visual machine-readable signal 104 is directed to a human 10. The human 10 either does not perceive the signal 104, or perceives it partially but it is meaningless to him. Accordingly, the visual output arrangement 102 is illustrated as being obscured and including arbitrary binary characters which, even if perceived by the human 10, would carry no ordinary or recognizable meaning.

Figure 2:
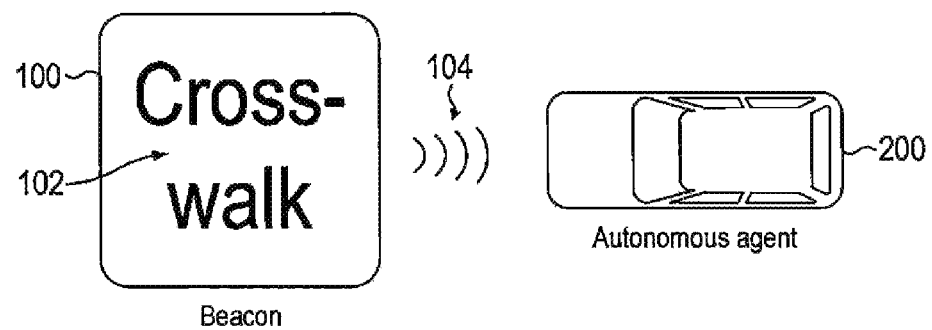
FIG. 2 illustrates a schematic view of the beacon of FIG. 1, when a signal from the beacon is received by the autonomous agent.

FIG. 2 illustrates the same beacon 100 with the visual machine-readable signal 104 directed to an autonomous agent 200 (which, by way of non-limiting example, is illustrated as a vehicle, e.g., a self-driving vehicle). The machine-readable signal 104 has meaning to the autonomous agent 200 and accordingly the output arrangement 102 is illustrated as having a meaning which in FIG. 2 is arbitrarily illustrated as "Cross-walk".

The output arrangement 102 may produce the machine-readable signal 104 in a way which is imperceptible to the human 10. For example, the output arrangement 102 may produce the machine-readable signal 104 at a wavelength, e.g., at an infra-red wavelength, outside of the normal human-visual spectrum. The machine-readable signal may be encoded in one or more of an intensity, a wavelength, a frequency, and/or a hue of the visual machine-readable signal 104.

FIGS. 1-2 illustrate a version of the beacon 100 in which the machine-readable signal 104 comprises a simple instruction or command, presuming that the autonomous agent 200 has been programmed to react to the instruction appropriately. For example, the autonomous agent 200 may already comprise instructions directing how it should react to a "Cross-walk" instruction. In another version, the beacon 100 may generate the machine-readable signal 104 to include computer code executable by the autonomous agent. For example, the machine-readable signal 104 may include instructions or computer code to direct the autonomous agent 200 to react appropriately, e.g., slow down to 10 mph and stop if an obstacle is detected.

The visual machine-readable signal 104 may include symbols which are orthogonal to human-readable symbols, that is, the meaning of the symbols do not correspond to an action a human can perform.

Figure 3:
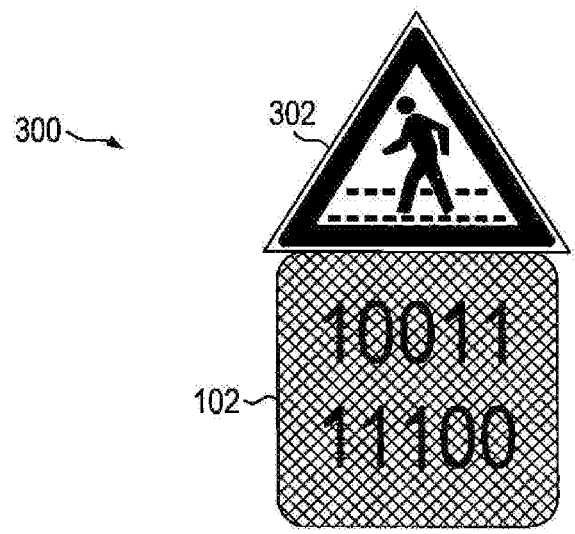
FIG. 3 illustrates a schematic view of another example embodiment of the beacon of FIG. 1, combined with a human-readable beacon or sign.
Figure 4:
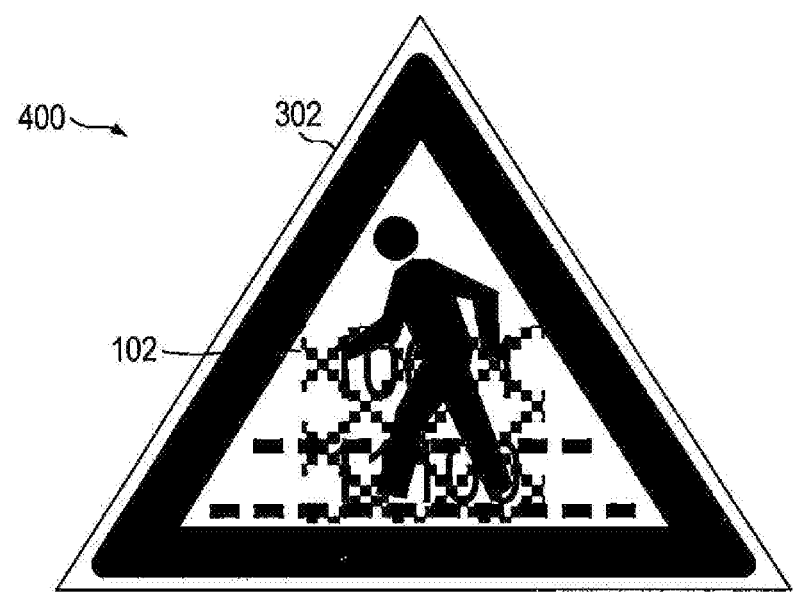
FIG. 4 illustrates a schematic view of another example embodiment of the beacon of FIG. 1, combined with a human-readable beacon or sign.

FIGS. 3-4 illustrate further versions of the beacon 100 (designated respectively as beacon 300 and beacon 400). The beacons 300, 400 include a human-readable portion 302 (e.g., a conventional road sign) and the visual output arrangement 102 which is only readable to the autonomous agent 200. A human 10 observing the road signs 302 may be entirely oblivious or agnostic to the existence of the visual machine-readable output arrangement 102.

The visual machine-readable output arrangement 102 may be provided alongside the human-readable portion 302 (as in beacon 300) or the visual machine-readable output arrangement 102 may be superimposed over the human-readable portion 302 (as in beacon 400).

Figure 5:
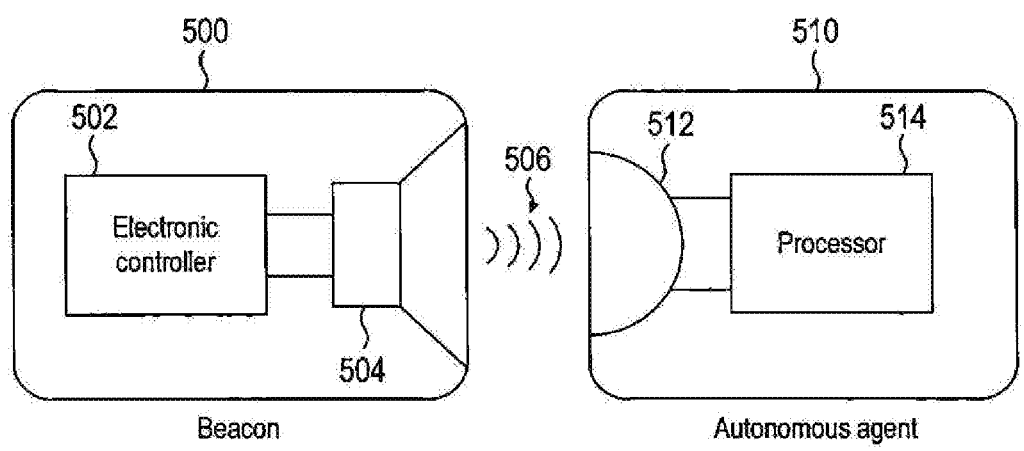
FIG. 5 illustrates a schematic view of another example embodiment of a beacon for providing audible instructions to an autonomous agent, in accordance with an example embodiment of the invention.

FIG. 5 illustrates another example embodiment of a beacon 500 and an autonomous agent 510. In this example, the beacon 500 has an electronic controller 502, an acoustic transducer 504 which functions as an audio output arrangement. The beacon 500 is configured to produce an audio machine-readable signal 506. The audio machine-readable signal 506 may be entirely inaudible to the human 10, e.g., being ultra-sonic. Instructions may be encoded in the audio machine-readable signal 506 using conventional coding techniques, including variation in an intensity and/or a pitch/frequency.

The autonomous agent 510 has a matched receiver in the form of an acoustic receiver 512 configured to receive the audio machine-readable signal 506. The autonomous agent 510 also has a processor 514 configured to resolve the instructions or command from the audio machine-readable signal 506 and optionally to execute the instructions.

The audio machine-readable signal 506 may include sounds which are orthogonal to human-perceptible sounds.

An embodiment may include a combination of both visual and audio machine-readable signals.

Figure 6:
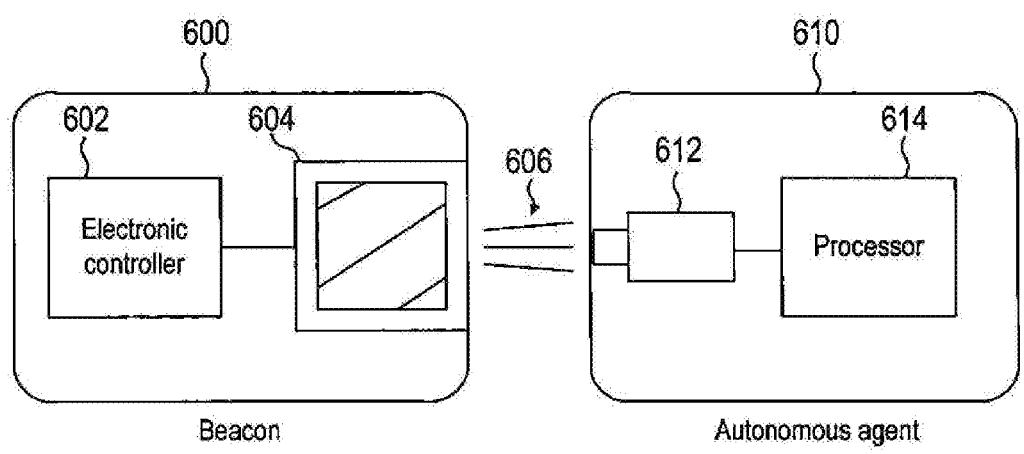
FIG. 6 illustrates a schematic view of another example embodiment of a beacon for providing visual instructions to an autonomous agent, in accordance with an example embodiment of the invention.

FIG. 6 illustrates another example embodiment of a beacon 600 and an autonomous agent 610. In this example, the beacon 600 also has an electronic controller 602, but includes a visual output arrangement in the form of a display screen 604. An autonomous agent 610 has a visual receiver (e.g., a camera) coupled to its processor 614. The electronic controller 602 is operable to generate a visual machine-readable signal 606 comprising the instruction to the autonomous agent 610. The visual machine-readable signal 606 may appear like one of the images in FIGS. 1-4.

The electronic controller 602 may include an encoding routine configured to encode the instruction (or instructions) into the machine-readable signal 606. Similarly, the processor 614 of the autonomous agent 610 may include a decoding routine configured to resolve the instruction from the machine-readable signal 606. The decoded instructions may then be parsed to actuators (not illustrated) of the autonomous agent 610.

The electronic controller 502, 602 may be configured to encode time-varying instructions in the machine-readable signal 506, 606. For example, if the beacon 500, 600 was serving the function of a traffic light, there may be three instructions (green, amber, red) encoded on a rotational basis, thereby to provide a time-varying machine-readable signal 506, 606.

Figure 7:
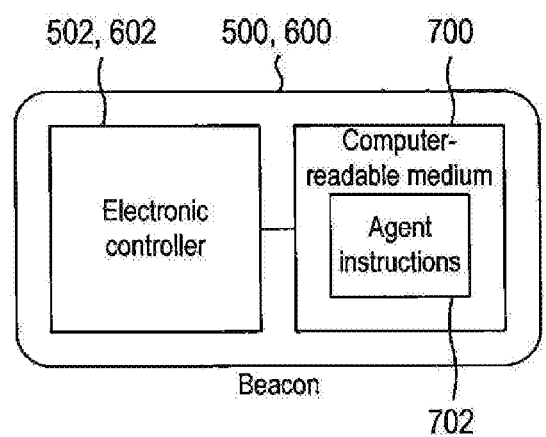
FIG. 7 illustrates a schematic view of the electronic controller of FIGS. 5-6 in more detail.

FIG. 7 illustrates the beacon 502, 602 in more detail. In addition to the controller 502, 602, the beacon 500, 600 comprises a computer-readable medium 700 on which the instruction (or instructions) is stored. The electronic controller 502, 602 is configured to read the instruction 702 from the computer-readable medium 700 and direct the output arrangement 504, 604 to generate the machine-readable signal 506, 606 comprising the instructions 702.

Figure 8:
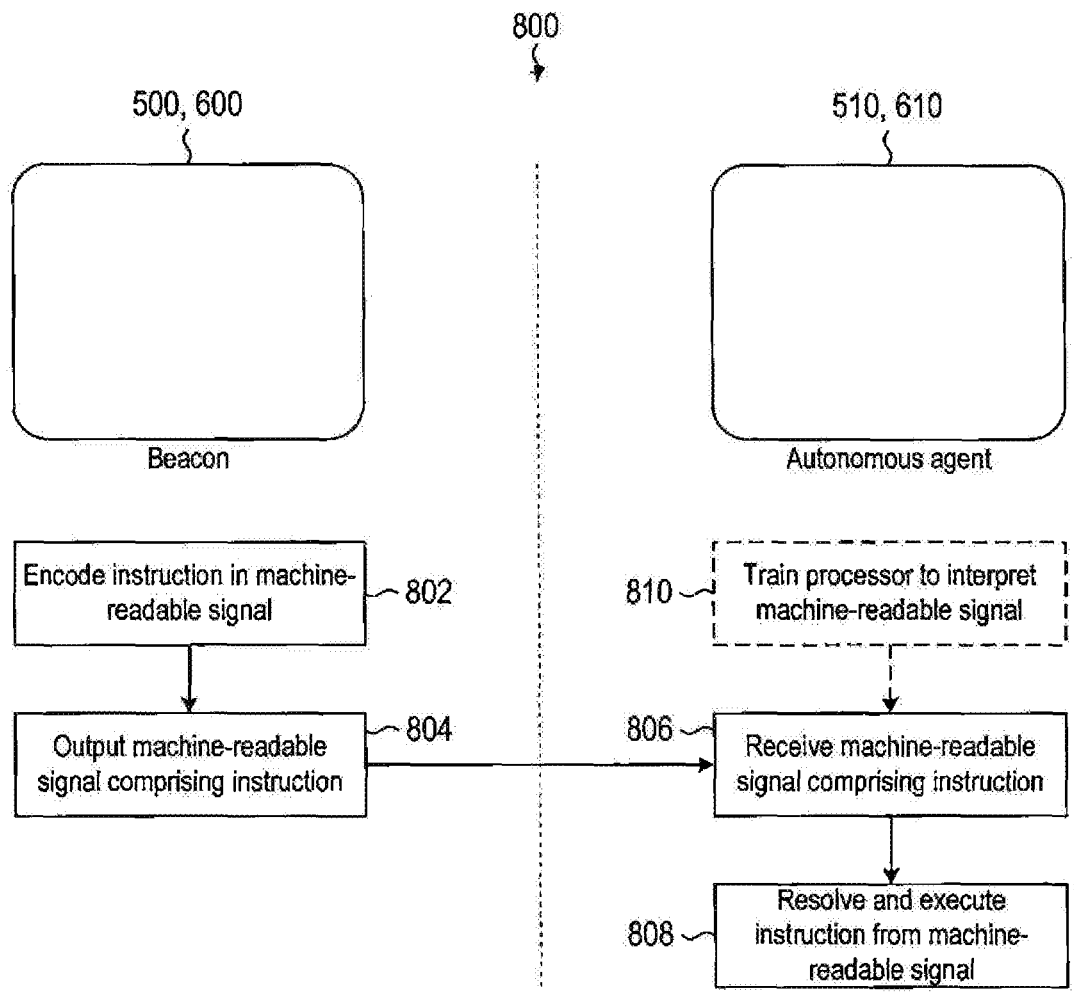
FIG. 8 illustrates a flow diagram of a method of providing instructions to an autonomous agent, in accordance with an example embodiment of the invention.

FIG. 8 illustrates a method 800 of providing instructions to an autonomous agent (e.g., the autonomous agent 510 of FIG. 5 or the autonomous agent 610 of FIG. 6). The method 800 comprises two parts, namely a first part implemented by a beacon (e.g., the beacon 500 of FIG. 5 or the beacon 600 of FIG. 6) and a second part implemented by the autonomous agent 510, 610. The method 800 is described with reference to the beacon 500, 600 and autonomous agent 510, 510 of FIGS. 5-6, but the method 800 may be implemented by a different system.

The instruction 702, or a plurality of instructions, is encoded (at block 802) in the machine readable signal 506, 606. This may be done only once, and each subsequent output produces the once-off encoded signal. Instead, this encoding may be done each time the machine-readable signal 506, 606 is produced, particularly if the machine-readable signal 506, 606 is time-varying. The machine-readable signal 506, 606 is then output (at block 804) by the acoustic transducer 504, display screen 604, or other output arrangement. The output may be intermittent, repetitive, constant, time-varying, static, continuous, or the like.

The method 800 includes receiving (at block 806) the machine-readable signal by the receiver 512, 612 of the autonomous agent 500, 600. The processor 514, 614 of the autonomous agent 510, 610 resolves the instruction from the machine-readable signal 506, 606. This may include comparing a similarity between the received machine-readable signal 506, 606 and stored reference signals embedded in the autonomous agent 510, 610. The same processor 514, 6614, or a different processor, may then execute the resolved instruction.

The method 800 may include a prior step (at block 810) of training the processor 514, 614 to interpret signals or resolve commands from signals. This may include training one or more classifiers of the autonomous agent 510, 610 to discriminate a set of variants of the machine-readable signal 506, 606 and a set of randomly sampled signals or signals expected in environments where the autonomous agent 510, 610 operates.

In a different embodiment, the autonomous agent 510, 610 may be configured to perform a series of actions by using a combination of visual and/or audio signals associated with multiple software modules of the autonomous agent 510, 610 to execute complex actions requiring several modules, where each visual/audio machine-readable signal 506, 606 activates a specific software routine in the autonomous agent 510, 610.

It is to be understood that the electronic controller 502, 602 and/or the agent processor 514, 614 may be one or more processors, microprocessors, controllers, Digital Signal Processors (DSPs), or any other suitable computing device, resource, hardware, software, or embedded logic.

An embodiment of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A beacon for providing instructions to an autonomous agent, the beacon comprising:
    a non-transitory computer-readable storage medium having stored thereon an instruction to an autonomous agent, the autonomous agent including a machine;
    an electronic controller communicatively coupled to the non-transitory computer-readable storage medium; and
    an output arrangement which is configured to output a machine-readable signal, the output arrangement including a road sign,
    wherein the electronic controller is configured to operate the output arrangement such that the machine-readable signal output by the output arrangement comprises the instruction to the autonomous agent, the machine-readable signals activating the autonomous agent to react to the road sign,
    wherein the machine-readable signal comprises at least one of:
    visual indicia which are orthogonal to indicia used in human language; and
    audible sounds which are orthogonal to sounds used in human language.

2. The beacon of claim 1, wherein the instruction of the machine-readable signal:
    references computer code accessible to the autonomous agent; and/or
    contains computer code executable by the autonomous agent.

3. The beacon of claim 1, wherein the machine-readable signal is a visual signal and comprises a visual display of wavelengths of light invisible to a human eye.

4. The beacon of claim 3, wherein the instruction is encoded in at least one of:
    an intensity;
    a wavelength;
    a frequency; and
    a hue, of the visual machine-readable signal.

5. The beacon of claim 1, wherein the machine-readable signal is an audible signal and comprises wavelengths of sound inaudible to a human ear.

6. The beacon of claim 5, wherein the instruction is encoded in at least one of:
    an intensity; and
    a pitch/frequency,
    of the audible machine-readable signal.

7. The beacon of claim 1, wherein the signal comprises a plurality of instructions, each of which is configured to execute a software routine in the autonomous agent.

8. The beacon of claim 1, wherein the output arrangement is configured to output the machine-readable signal which is one of at least:
    fixed in time; or
    time-varying.

9. The beacon of claim 1, wherein the machine-readable signal includes a combination of both audio and visual machine readable signals.

10. An autonomous agent system which includes:
    a beacon for providing instructions to an autonomous agent, the beacon comprising:
        a non-transitory computer-readable storage medium having stored thereon an instruction to an autonomous agent, the autonomous agent including a machine;
        an electronic controller communicatively coupled to the non-transitory computer-readable storage medium; and
        an output arrangement which is configured to output a machine-readable signal the output arrangement including a road sign;
        wherein the electronic controller is configured to operate the output arrangement such that the machine-readable signal output by the output arrangement comprises the instruction to the autonomous agent; and
    an autonomous agent which includes:
        a receiver which is receptive to the machine-readable signal; and
        a processor which is configured to execute the instruction of the machine-readable signal,
        the autonomous agent configured to autonomously react to the road sign,
    wherein the machine-readable signal comprises at least one:
        visual indicia which are orthogonal to indicia used in human language; and
        audible sounds which are orthogonal to sounds used in human language.

11. The system of claim 10, wherein the machine-readable signal includes a combination of both audio and visual machine readable signals.

12. A method of providing instructions to an autonomous agent, the method comprising:
    outputting, by a beacon comprising a non-transitory computer-readable storage medium having stored thereon an instruction to an autonomous agent and an electronic controller communicatively coupled to the non-transitory computer-readable storage medium, a machine-readable signal,
    wherein the electronic controller is configured to operate an output arrangement including a road sign such that the machine-readable signal output by the output arrangement comprises the instruction to the autonomous agent, the autonomous agent including a machine, the machine-readable signals activating the autonomous agent to react to the road sign,
wherein the machine-readable signal comprises at least one of:
visual indicia which are orthogonal to indicia used in human language; and
audible sounds which are orthogonal to sounds used in human language.

13. The method of claim 12, wherein the instruction of the machine-readable signal:
points to computer code stored within to the autonomous agent; and/or
contains computer code executable by the autonomous agent.

14. The method of claim 12, wherein the machine-readable signal is a visual signal and comprises a visual display of wavelengths of light invisible to a human eye.

15. The method of claim 14, wherein the instruction is encoded in at least one of:
an intensity;
a wavelength;
a frequency; and
a hue,
of the visual machine-readable signal.

16. The method of claim 12, wherein the machine-readable signal is an audible signal and comprises wavelengths of sound inaudible to a human ear.

17. The method of claim 16, wherein the instruction is encoded in at least one of:
an intensity; and
a pitch/frequency,
of the audible machine-readable signal.

18. The method of claim 12, wherein the machine-readable signal comprises a plurality of instructions, each of which is configured to address a software routine in the autonomous agent.

19. The method of claim 12, wherein the autonomous agent is configured to resolve instructions from the machine-readable signal by comparing a similarity between the machine-readable signal and reference machine-readable signals stored in the autonomous agent.

20. The method of claim 12, comprising detecting, by the autonomous agent, the machine-readable signal associated with specific instructions by training one or more classifiers of the autonomous agent to discriminate a set of variants of the machine-readable signal and a set of signals expected in environments where the autonomous agent operates.

* * * * *